US008821347B2

(12) United States Patent
Fukui

(10) Patent No.: US 8,821,347 B2
(45) Date of Patent: Sep. 2, 2014

(54) VEHICLE CONTROL DEVICE AND VEHICLE CONTROL METHOD

(75) Inventor: Toshinao Fukui, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 31 days.

(21) Appl. No.: 13/493,662

(22) Filed: Jun. 11, 2012

(65) Prior Publication Data

US 2012/0322616 A1    Dec. 20, 2012

(30) Foreign Application Priority Data

Jun. 17, 2011    (JP) .................................. 2011-135396

(51) Int. Cl.
*B60W 10/06*    (2006.01)

(52) U.S. Cl.
USPC .......................................... 477/203; 477/210

(58) Field of Classification Search
CPC .............................. B60K 26/04; B60W 40/09
USPC .................. 477/203; 701/57, 59, 60
See application file for complete search history.

(56) References Cited

U.S. PATENT DOCUMENTS

| 5,924,508 | A  | * | 7/1999 | Clauss et al. ................... | 180/179 |
| 2004/0099085 | A1 | * | 5/2004 | Olofsson ......................... | 74/513 |
| 2004/0166989 | A1 | * | 8/2004 | Carlsson ......................... | 477/92 |

FOREIGN PATENT DOCUMENTS

| JP | 61190135 A | 8/1986 |
| JP | 2007-112438 A | 5/2007 |
| JP | 2007-168516 A | 7/2007 |
| JP | 2008-063953 A | 3/2008 |
| JP | 2009-001066 A | 1/2009 |

* cited by examiner

*Primary Examiner* — David D Le
*Assistant Examiner* — Stacey Fluhart
(74) *Attorney, Agent, or Firm* — Gifford, Krass, Sprinkle, Anderson & Citkowski, P.C.

(57) ABSTRACT

A vehicle control device includes: an erroneous operation determination unit that determines whether erroneous operation of an accelerator pedal is performed; an increase suppression unit that suppresses an increase in driving force of a vehicle in response to the erroneous operation of the accelerator pedal; a position measuring unit that measures the depressed position of a brake pedal; a tendency determination unit that determines a deviation tendency of the depressed position of the brake pedal; and a suppression amount varying unit that varies a suppression amount of the increase in the driving force on the basis of the deviation tendency.

6 Claims, 4 Drawing Sheets

VEHICLE CONTROL DEVICE AND VEHICLE CONTROL METHOD

CROSS REFERENCE TO RELATED APPLICATIONS

This application claims priority to Japanese Patent Application No. 2011-135396 filed on Jun. 17, 2011, which is incorporated herein by reference in its entirety including the specification, drawings and abstract.

BACKGROUND OF THE INVENTION

1. Field of the Invention

The invention relates to a vehicle control device and vehicle control method that suppress an increase in the driving force of a vehicle in response to erroneous operation of an accelerator pedal.

2. Description of Related Art

There has been a situation that an accelerator pedal is depressed in mistake for a brake pedal to accelerate a vehicle against an intention. A vehicle control device described in Japanese Patent Application Publication No. 61-190135 (JP 61-190135 A) is proposed as a technique for avoiding such a situation. The vehicle control device described in JP 61-190135 A suppresses an increase in the driving force of a vehicle by, for example, reducing the fuel supply amount of an engine when a depression force on an accelerator pedal or a depression speed of the accelerator pedal exceeds a set value while driving at a high gear ratio of a transmission.

Generally, a depression force on an accelerator pedal and a depression speed of the accelerator pedal in normal driving are respectively smaller than a depression force on a brake pedal and a depression speed of the brake pedal at the time when a vehicle is rapidly stopped. Therefore, recognizing strong depression of the accelerator pedal as depression of the accelerator pedal in mistake for the brake pedal is almost reasonable. However, a driver who seeks sporty running may intentionally strongly depress the accelerator pedal. Therefore, if strong depression of the accelerator pedal is uniformly determined as erroneous depression to thereby suppress an increase in driving force, such a driver's request is impaired, and the flexibility of driving may be limited.

SUMMARY OF THE INVENTION

The invention provides a vehicle control device and vehicle control method that maintains a driver's sense of safety and relieves limitations on the flexibility of driving to thereby improve drivability.

Generally, drivers each have his own tendency of the way of depressing a brake pedal. For example, some drivers depress positions that deviate from the widthwise center of the brake pedal. A factor of depressing an accelerator pedal in mistake for a brake pedal is presumably in connection with the deviation tendency of such depressed positions of the brake pedal. That is, it is possible to determine the level of probability that the accelerator pedal is depressed in mistake for the brake pedal on the basis of the deviation tendency of the depressed positions of the brake pedal. For example, when the dispersion in depressed positions of the brake pedal is large, it may be regarded that the probability that the accelerator pedal is depressed in mistake for the brake pedal is high. In addition, when the depressed positions are stable, it may be regarded that the probability that the accelerator pedal is depressed in mistake for the brake pedal is low.

A first aspect of the invention relates to a vehicle control device. The vehicle control device includes: an erroneous operation determination unit that determines whether erroneous operation of an accelerator pedal is performed; an increase suppression unit that suppresses an increase in driving force of a vehicle in response to the erroneous operation of the accelerator pedal; a position measuring unit that measures the depressed position of a brake pedal; a tendency determination unit that determines a deviation tendency of the depressed position of the brake pedal; and a suppression amount varying unit that varies a suppression amount of the increase in the driving force on the basis of the deviation tendency.

A second aspect of the invention relates to a vehicle control device. The vehicle control device includes: a parameter detection unit that detects a parameter associated with operation of an accelerator pedal; an erroneous operation determination unit that determines that erroneous operation of the accelerator pedal is performed when the parameter exceeds a setting level; an increase suppression unit that suppresses an increase in driving force of a vehicle in response to the erroneous operation of the accelerator pedal; a position measuring unit that measures a depressed position of a brake pedal; a tendency determination unit that determines a deviation tendency of the depressed position of the brake pedal; and a setting level varying unit that varies the setting level on the basis of the deviation tendency.

A third aspect of the invention relates to a vehicle control method. The vehicle control method includes: determining whether erroneous operation of an accelerator pedal is performed; suppressing an increase in driving force of a vehicle in response to the erroneous operation of the accelerator pedal; measuring a depressed position of a brake pedal; determining a deviation tendency of the depressed position of the brake pedal; and varying a suppression amount of the increase in the driving force on the basis of the deviation tendency.

A fourth aspect of the invention relates to a vehicle control method. The vehicle control method includes: detecting a parameter associated with operation of an accelerator pedal; determining that erroneous operation of the accelerator pedal is performed when the parameter exceeds a setting level; suppressing an increase in driving force of a vehicle in response to the erroneous operation of the accelerator pedal; measuring a depressed position of a brake pedal; determining a deviation tendency of the depressed position of the brake pedal; and varying the setting level on the basis of the deviation tendency.

According to these aspects of the invention, a driver's sense of safety is ensured and also the flexibility of driving is achieved, so drivability improves.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Embodiment

Figure 1:
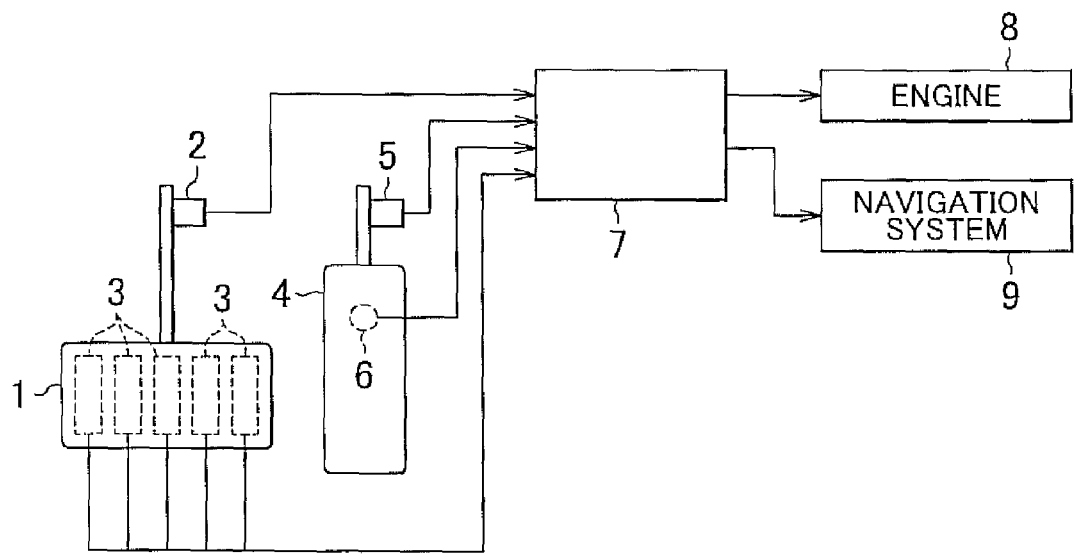
FIG. 1 is a schematic view that schematically shows the overall structure of a vehicle control device according to a first embodiment of the invention.
Figure 2:
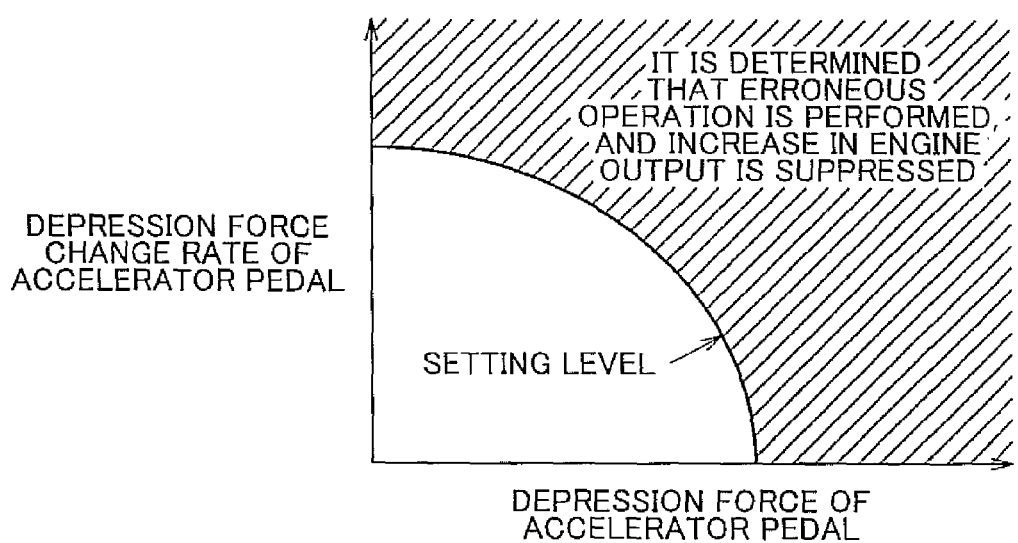
FIG. 2 is a graph that shows a mode of determination as to erroneous operation in the first embodiment.

Hereinafter, a first embodiment of the invention will be described in detail with reference to FIG. 1 to FIG. 3. Note that erroneous operation of an accelerator pedal corresponds to erroneous depression of the accelerator pedal.

First, the configuration of a vehicle control device according to the first embodiment will be described with reference to FIG. 1. As shown in FIG. 1, a brake pedal 1 is provided with a brake pedal stroke sensor 2. The brake pedal stroke sensor 2 detects the depression amount of the brake pedal 1. In addition, in the first embodiment, a plurality of pressure sensors 3 are installed in the brake pedal 1 at equal intervals in the widthwise direction. On the other hand, an accelerator pedal 4 is provided with an accelerator position sensor 5 and a depression force detection switch 6. The accelerator position sensor 5 detects the depression amount of the accelerator pedal 4. The depression force detection switch 6 detects the depression force on the accelerator pedal 4.

The brake pedal stroke sensor 2, the pressure sensors 3, the accelerator position sensor 5 and the depression force detection switch 6 are connected to a controller 7. The controller 7 governs control over an engine 8. The controller 7 includes a central processing unit (CPU), a read only memory (ROM) and a random access memory (RAM). The CPU executes various processings associated with engine control. The ROM stores programs and data for engine control. The RAM temporarily stores computation results of the CPU, detection results of sensors, and the like. Note that the controller 7 is connected to a navigation system 9 through an in-vehicle LAN. The navigation system 9 carries out a route guide to a destination while a vehicle is running.

In addition, while the vehicle is running, the controller 7 determines whether the driver depresses the accelerator pedal 4 in mistake for the brake pedal 1. When it is determined that erroneous depression of the accelerator pedal 4 is performed, the controller 7 suppresses an increase in the output of the engine 8 by, for example, decreasing the throttle opening degree. In the first embodiment, determination as to erroneous operation of the accelerator pedal 4 is carried out on the basis of a depression force on the accelerator pedal 4 and a depression force change rate (a rate of change in depression force). When a combination of the depression force and the depression force change rate exceeds a setting level for determination as to erroneous operation, it is determined that erroneous operation of the accelerator pedal 4 is performed. More specifically, the curve shown in FIG. 2 is set as a setting level in an orthogonal coordinate system of which the coordinate axes respectively represent a depression force and a depression force change rate. Then, when it is determined that the combination of a depression force and a depression force change rate falls outside the setting level (falls within the shaded area), it is determined that erroneous operation of the accelerator pedal 4 is performed.

In the first embodiment, an increase in engine output in response to such erroneous operation of the accelerator pedal 4 is suppressed. In this control for suppressing an increase in engine output, the deviation tendency of a contact or depressed position on the brake pedal 1 is determined. Then, a suppression amount of the increase in engine output at the time when it is determined that erroneous operation is performed is varied on the basis of the deviation tendency. A suppression amount of the increase in engine output is varied through the process of engine output increase suppression amount setting routine at the time of accelerator erroneous operation, shown in FIG. 3. Note that the process of the routine shown in FIG. 3 is repeatedly executed at prescribed control intervals by the controller 7 while the vehicle is running.

Figure 3:
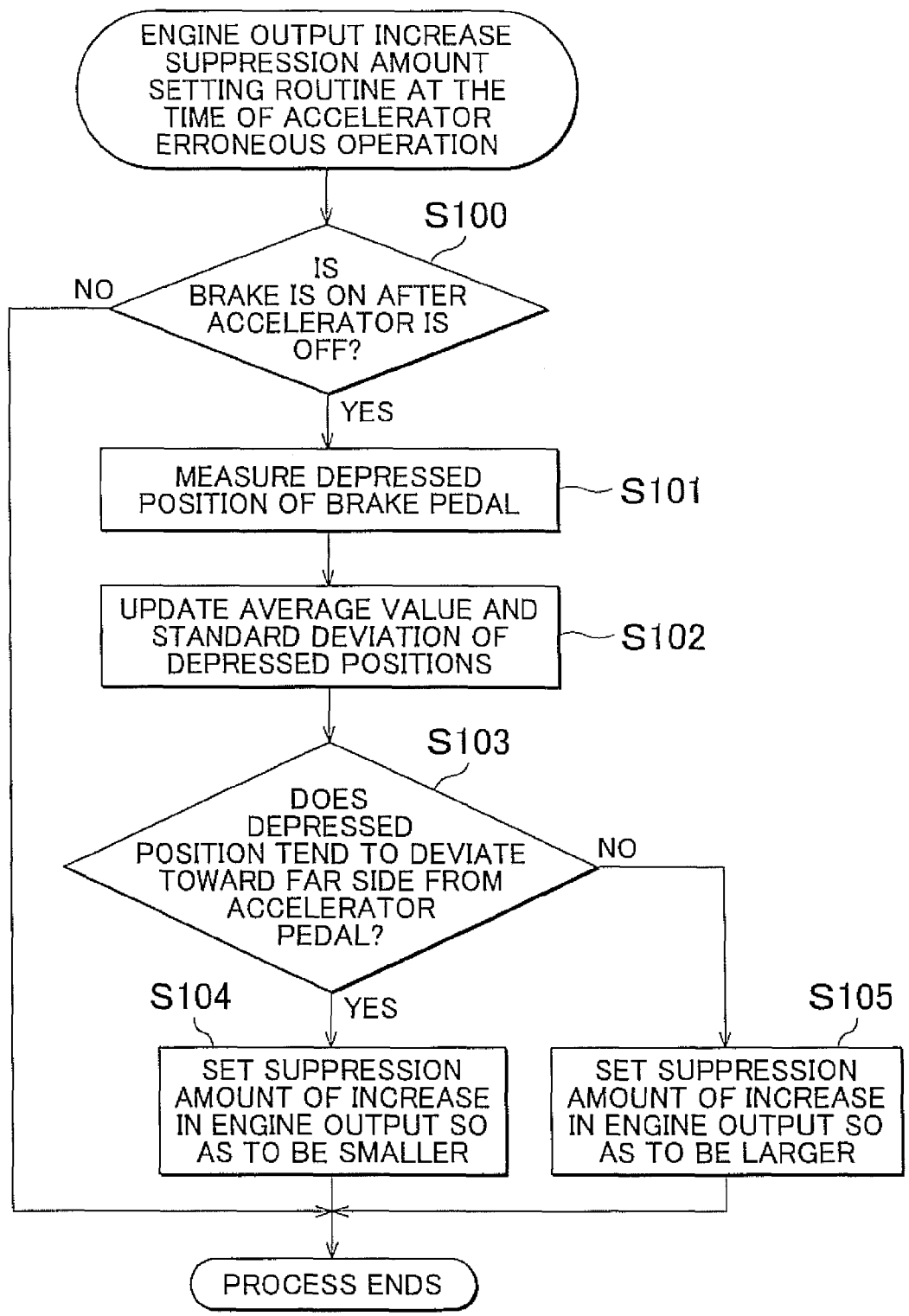
FIG. 3 is a flow chart that shows the procedure of engine output increase suppression amount setting routine at the time of erroneous operation of an accelerator pedal, employed in the first embodiment.

When the routine shown in FIG. 3 is started, it is determined whether depression of the accelerator pedal 4 is released (the accelerator is off) and then the brake pedal 1 is depressed (the brake is on) in step S100. Here, when it is not determined that the brake is on after the accelerator is off (NO in S100), the process of the current routine directly ends. On the other hand, when it is determined that the brake is on after the accelerator is off (YES in S100), the process proceeds to step S101.

In step S101, the depressed position of the brake pedal 1 is measured. The depressed position is measured on the basis of the detection results of the pressure sensors 3. Then, in subsequent step S102, the average value and standard deviation of depressed positions are updated.

In subsequent step S103, it is determined whether the depressed position of the brake pedal 1 tends to deviate toward a far side from the accelerator pedal 4 on the basis of the average value or standard deviation of the depressed positions (hereinafter, the deviation tendency of the depressed position of the brake pedal 1 toward the far side from the accelerator pedal 4 and the deviation tendency of the depressed position of the brake pedal 1 toward a near side to the accelerator pedal 4 may be respectively simply referred to as "far-side deviation tendency" and "near-side deviation tendency", and these may be collectively referred to as "deviation tendency"). For example, determination as to the deviation tendency may be carried out by comparing the average value of the depressed positions with a value corresponding to the widthwise center position of the brake pedal 1. Then, when the depressed position of the brake pedal 1 tends to deviate toward the far side from the accelerator pedal 4 (YES in S103), a suppression amount of the increase in engine output is set so as to be smaller than when the depressed position of the brake pedal 1 does not tend to deviate toward the far side (NO in S103) in step S104. On the other hand, when there is no far-side deviation tendency (NO in S103), a suppression amount of the increase in engine output is set so as to be larger than when there is the far-side deviation tendency (YES in S103) in step S105. The case where there is no far-side deviation tendency includes the case where there is the near-side deviation tendency.

In addition, in the first embodiment, the controller 7 displays the deviation tendency of the depressed position of the brake pedal 1 on the screen of the navigation system 9. For example, when it is determined that the depressed position of the brake pedal 1 tends to deviate toward the near side to the accelerator pedal 4, the text "the depressed position of the brake pedal deviates rightward" is displayed. This display is not limited to text; instead, the display may be, for example, image.

Next, the operation of the thus configured first embodiment will be described. In the first embodiment, when the combination of the depression force and depression force change rate of the accelerator pedal 4 exceeds the setting level, it is determined that the accelerator pedal 4 is erroneously operated. When it is determined that erroneous operation of the accelerator pedal 4 is performed, the increase in the output of the engine 8 is suppressed and, by extension, the increase in the driving force of the vehicle is suppressed. On the other hand, in the first embodiment, in the routine of FIG. 3, the deviation tendency of the depressed position of the brake pedal 1 is determined. In the routine shown in FIG. 3, when it is determined that the depressed position of the brake pedal 1 tends to deviate toward the far side from the accelerator pedal 4, a suppression amount of the increase in engine output at the time when it is determined that erroneous operation of the accelerator pedal 4 is performed is set so as to be smaller than when there is no far-side deviation tendency. When the depressed position of the brake pedal 1 tends to deviate toward the far side from the accelerator pedal 4, it may be regarded that the accelerator pedal 4 is hard to be erroneously operated. That is, when it is determined that erroneous operation of the accelerator pedal 4 is performed, a suppression amount of the increase in engine output is set so as to be smaller when the accelerator pedal 4 is hard to be erroneously operated than when the accelerator pedal 4 is easily erroneously operated. On the other hand, when it is determined that erroneous operation of the accelerator pedal 4 is performed, a suppression amount of the increase in engine output is set so as to be larger when the accelerator pedal 4 is easily erroneously operated than when the accelerator pedal 4 is hard to be erroneously operated.

With the vehicle control device according to the above described first embodiment, the following advantageous effects are obtained. In the first embodiment, the deviation tendency of the depressed position of the brake pedal 1 is determined. Then, a suppression amount of the increase in the output of the engine 8 and, by extension, a suppression amount of the increase in the driving force of the vehicle at the time when it is determined that erroneous operation of the accelerator pedal 4 is performed is varied on the basis of the deviation tendency. More specifically, when it is determined that the depressed position of the brake pedal 1 tends to deviate toward the far side from the accelerator pedal 4, a suppression amount of the increase in the output of the engine 8 at the time when it is determined that erroneous operation of the accelerator pedal 4 is performed is set so as to be smaller than when there is no far-side deviation tendency. That is, when the accelerator pedal 4 is hard to be erroneously operated, a suppression amount of the increase in engine output is set so as to be smaller than when the accelerator pedal 4 is easily erroneously operated. As a result, limitations on the flexibility of driving may be relieved. On the other hand, when it is determined that erroneous operation of the accelerator pedal 4 is performed, a suppression amount of the increase in engine output is set so as to be larger when the accelerator pedal 4 is easily erroneously operated than when the accelerator pedal 4 is hard to be erroneously operated. As a result, a situation that the vehicle is accelerated against an intention may be avoided. Thus, according to the first embodiment, a driver's sense of safety is maintained and also limitations on the flexibility of driving are relieved to thereby make it possible to improve drivability. Here, when the accelerator pedal is easily erroneously operated, a suppression amount of the increase in the driving force of the vehicle may be set at 0.

In the first embodiment, the driver is notified of the deviation tendency of the depression position of the brake pedal. Therefore, the driver is informed of the tendency of his own way of depressing the brake pedal and is prompted to keep in mind appropriate brake operation.

Second Embodiment

Next, a second embodiment of the invention will be described in detail with reference to FIG. 4 and FIG. 5. Note that, in the second embodiment, like reference numerals denote components common to the first embodiment and the detailed description thereof is omitted.

In the first embodiment, a suppression amount of the increase in the driving force of the vehicle at the time when it is determined that the accelerator pedal 4 is erroneously operated is varied on the basis of the deviation tendency of the depressed position of the brake pedal. In contrast to this, in the second embodiment, the setting level for the combination of the depression force and depression force change rate of the accelerator pedal 4 for determination as to erroneous operation is varied on the basis of the deviation tendency of the depressed position of the brake pedal.

Figure 4:
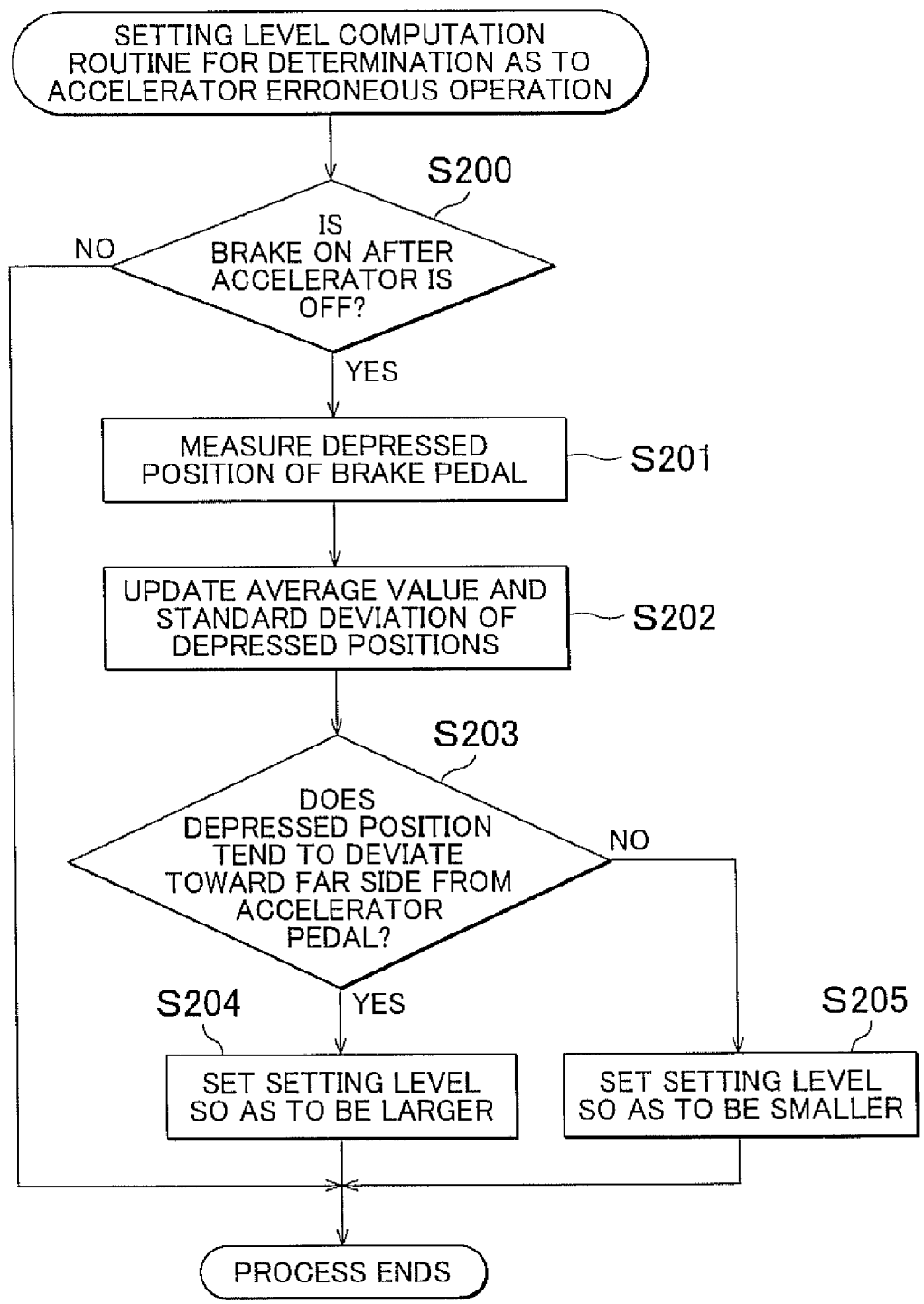
FIG. 4 is a flow chart that shows the procedure of setting level computation routine for determination as to accelerator erroneous operation, employed in a second embodiment of the invention.

The setting level is varied through the process of setting level computation routine for determination as to accelerator erroneous operation, shown in FIG. 4. Note that the process of the routine shown in FIG. 4 is repeatedly executed at prescribed control intervals by the controller 7 while the vehicle is running.

When the routine shown in FIG. 4 is started, it is determined whether depression of the accelerator pedal 4 is released (the accelerator is off and then the brake pedal 1 is depressed (the brake is on) in step S200. Here, when it is not determined that the brake is on after the accelerator is off (NO in S200), the process of the current routine directly ends; otherwise, the process proceeds to step S201.

When the process proceeds to step S201, the depressed position of the brake pedal 1 is measured. The depressed position is measured on the basis of the detection results of the pressure sensors 3. Then, in subsequent step S202, the average value and standard deviation of depressed positions are updated.

In subsequent step S203, it is determined whether the depressed position of the brake pedal 1 tends to deviate toward the far side from the accelerator pedal 4 on the basis of the average value or standard deviation of the depressed positions. Then, when the depressed position of the brake pedal 1 tends to deviate toward the far side from the accelerator pedal 4 (YES in S203), the setting level is set, so as to be larger than when there is no far-side deviation tendency (NO in S203) in step S204. When there is no far-side deviation tendency (NO in S203), the setting level is set so as to be smaller than when there is the far-side deviation tendency (YES in S203) in step S205.

Figure 5:
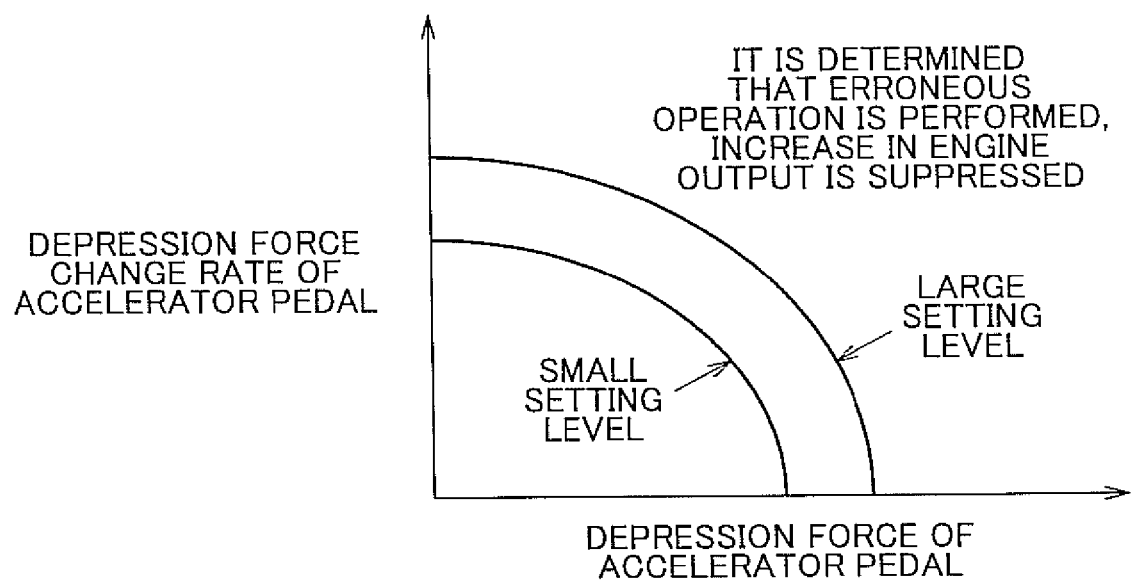
FIG. 5 is a graph that shows a mode of determination as to erroneous operation in the second embodiment.

In the second embodiment, as shown in FIG. 5, when the depressed position of the brake pedal 1 tends to deviate toward the far side from the accelerator pedal 4, the setting level is set so as to be larger in both the depression force and depression force change rate of the accelerator pedal 4 than when there is no far-side deviation tendency. Therefore, when the accelerator pedal 4 is hard to be erroneously operated in mistake for the brake pedal 1 from the tendency of the way of depressing the brake pedal 1, it is not determined that erroneous operation of the accelerator pedal 4 is performed even when the accelerator pedal 4 is strongly depressed to a certain degree. That is, in the second embodiment, when the accelerator pedal 4 is easily erroneously operated, the increase in driving force is not suppressed when the accelerator pedal 4 is strongly depressed to a certain degree. In other words, even at the same depression force and same depression force change rate of the accelerator pedal, driving force may not be suppressed when the accelerator pedal is hard to be erroneously operated; whereas the increase in driving force may be suppressed when the accelerator pedal is easily erroneously operated.

With the vehicle control device according to the second embodiment, the following advantageous effects are obtained. In the second embodiment, the deviation tendency of the depressed position of the brake pedal is determined. The setting level for the combination of the depression force and depression force change rate of the accelerator pedal 4, at or above which it is determined that erroneous operation of the accelerator pedal 4 is performed, is varied on the basis of the deviation tendency. Specifically, when the depressed position of the brake pedal 1 tends to deviate toward the far side from the accelerator pedal 4, the setting level for both the depression force and depression force change rate of the accelerator pedal 4 is set so as to be larger than when there is no far-side deviation tendency. Here, the setting level may be varied by varying any one of the depression force and the depression force change rate. That is, when the accelerator pedal 4 is hard to be erroneously operated, the increase in driving force is not suppressed even when the accelerator pedal 4 is strongly depressed to a certain degree. By so doing, limitations on the flexibility or driving may be relieved. On the other hand, when the accelerator pedal 4 is easily erroneously operated, the increase in driving force is suppressed even when the operation force of the accelerator pedal 4 does not reach the operation force at which it is not determined that erroneous operation of the accelerator pedal 4 is performed in the case where the accelerator pedal 4 is hard to be erroneously operated. As a result, a situation that the vehicle is accelerated against an intention may be avoided. Thus, according to the second embodiment, a driver's sense of safety is maintained and also limitations on the flexibility of driving are relieved to thereby make it possible to improve drivability.

Note that the first embodiment and the second embodiment may be modified into the following alternative embodiments. In the first embodiment and the second embodiment, when the depressed position of the brake pedal 1 tends to deviate toward the far side from the accelerator pedal 4, it is determined that the accelerator pedal 4 is hard to be erroneously operated. In contrast to this, the index of the deviation tendency may be the dispersion (standard deviation) in the depressed positions of the brake pedal 1. When the dispersion in the depressed positions is at or above a predetermined value, it may be regarded that the accelerator pedal 4 is easily erroneously operated in mistake for the brake pedal 1. On the other hand, when the dispersion is below the predetermined value, that is, when the depressed positions are stable, it may be regarded that the accelerator pedal 4 is hard to be erroneously operated. Therefore, a suppression amount of the increase in the driving force of the vehicle at the time when it is determined that erroneous operation of the accelerator pedal 4 is performed may be set so as to be smaller when it is determined that the dispersion in the depressed positions of the brake pedal 1 is below the predetermined value than when the dispersion is at or above the predetermined value. In addition, the setting level for the combination of the depression force and depression force change rate of the accelerator pedal 4, at which it is determined that erroneous operation of the accelerator pedal 4 is performed may be set so as to be larger when it is determined that the dispersion in the depressed positions of the brake pedal 1 is below the predetermined value than when the dispersion is at or above the predetermined value. According to this alternative embodiment as well, the same operation and advantageous effects as those of the first embodiment and the second embodiment are obtained. In addition, determination based on the far-side deviation tendency and the dispersion in the depressed positions may be used in combination.

In the first embodiment and the second embodiment, it is determined whether erroneous operation of the accelerator pedal 4 is performed on the basis of the depression force and depression force change rate of the accelerator pedal 4. In contrast to this, erroneous operation may be determined on the basis of the depression amount or depression speed of the accelerator pedal 4. In short, among parameters for detecting operation of the accelerator pedal, at least one parameter just needs to be detected. Then, it is only necessary that, when at least one of detected parameters exceeds the setting level, it is determined that erroneous operation of the accelerator pedal 4 is performed and then a suppression amount of the increase in driving force is reduced. As described above, parameters for detecting operation of the accelerator pedal, for example, include the depression force, depression force change rate, depression amount and depression speed of the accelerator pedal 4.

In the above described embodiments, the deviation tendency of the depressed position of the brake pedal 1 is displayed on the screen of the navigation system 9 to thereby notify the driver. Instead, the deviation tendency may be indicated on an instrument panel, or the like, other than the screen of the navigation system 9. In addition, the driver may be notified of the deviation tendency of the depressed position of the brake pedal 1 by voice.

In the above described embodiments, the driver is notified of the deviation tendency of the depressed position of the brake pedal 1; however, such notification may not be provided.

What is claimed is:

1. A vehicle control device comprising
a controller that decreases driving force of a vehicle when at least one of a depression force of an accelerator pedal, a rate of change in the depression force of the accelerator pedal, a depression amount of the accelerator pedal, and a depression speed of the accelerator pedal exceeds a setting level, the controller varying an amount of decrease in the driving force on a basis of a far-side deviation tendency or a near-side deviation tendency, from the accelerator pedal, of a contact position on a brake pedal.

2. The vehicle control device according to claim 1, wherein when the contact position on the brake pedal has the far-side deviation tendency from the accelerator pedal, the controller reduces the amount of decrease in the driving force.

3. The vehicle control device according to claim 1, wherein the controller notifies a driver of the far-side deviation tendency or the near-side deviation tendency of the contact position on the brake pedal.

4. A vehicle control device comprising
a controller that decreases driving force of a vehicle when at least one of a depression force of an accelerator pedal, a rate of change in the depression force of the accelerator pedal, a depression amount of the accelerator pedal, and a depression speed of the accelerator pedal exceeds a setting level, the controller varying the setting level on a basis of a far-side deviation tendency or a near-side deviation tendency, from the accelerator pedal, of a contact position on a brake pedal.

5. The vehicle control device according to claim 4, wherein when the contact position on the brake pedal has the far-side deviation tendency from the accelerator pedal, the controller raises the setting level.

6. The vehicle control device according to claim 4, wherein the controller notifies a driver of the far-side deviation tendency or the near-side deviation tendency of the contact position on the brake pedal.

* * * * *